(12) United States Patent
Takeuchi et al.

(10) Patent No.: US 7,707,777 B2
(45) Date of Patent: May 4, 2010

(54) DOORFRAME STRUCTURE

(75) Inventors: Katsuhiko Takeuchi, Aichi-ken (JP); Akiyoshi Mori, Chita (JP); Masashige Ono, Toyota (JP); Masaru Toyota, Toyota (JP); Hirokazu Kawabe, Toyota (JP)

(73) Assignees: Aisin Seiki Kabushiki Kaisha, Kariya-shi, Aichi-ken (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 511 days.

(21) Appl. No.: 11/088,862

(22) Filed: Mar. 25, 2005

(65) Prior Publication Data

US 2005/0223648 A1 Oct. 13, 2005

(30) Foreign Application Priority Data

Mar. 25, 2004 (JP) ............................. 2004-090338

(51) Int. Cl.
B60J 5/04 (2006.01)
(52) U.S. Cl. ..................................... 49/502; 296/146.5
(58) Field of Classification Search ................ 49/502, 49/440, 441; 296/146.5, 146.16
See application file for complete search history.

(56) References Cited

U.S. PATENT DOCUMENTS

| | | | | | |
|---|---|---|---|---|---|
| 2,660,470 | A | * | 11/1953 | Nelson | ......................... 49/502 |
| 2,892,657 | A | * | 6/1959 | Brand et. al. | ................... 49/440 |
| 2,946,622 | A | * | 7/1960 | Abbott | ......................... 49/166 |
| 4,432,167 | A | * | 2/1984 | Watanuki | ..................... 49/502 |
| 4,457,111 | A | * | 7/1984 | Koike | ........................... 49/441 |
| 4,605,260 | A | * | 8/1986 | Sakakibara et al. | .......... 296/201 |
| 4,625,458 | A | * | 12/1986 | Okamoto | ..................... 49/374 |
| 4,689,916 | A | * | 9/1987 | Shimizu | ....................... 49/374 |
| 4,910,914 | A | * | 3/1990 | Asoh | ............................ 49/214 |
| 4,969,295 | A | * | 11/1990 | Nishikawa et al. | ............ 49/502 |
| 5,080,424 | A | | 1/1992 | Scholtyssek | |
| 5,557,890 | A | | 9/1996 | Levy et al. | |
| 5,732,509 | A | * | 3/1998 | Buehler et al. | ................. 49/440 |
| 5,857,732 | A | * | 1/1999 | Ritchie | ..................... 296/146.5 |
| 6,119,407 | A | * | 9/2000 | Staser et al. | ................... 49/502 |

(Continued)

FOREIGN PATENT DOCUMENTS

EP 0 581 389 7/1993

(Continued)

Primary Examiner—Katherine W Mitchell
Assistant Examiner—Catherine A Kelly
(74) Attorney, Agent, or Firm—Finnegan, Henderson, Farabow, Garrett & Dunner, LLP (57) ABSTRACT

A doorframe structure comprises an upper guide formed of metal plate so as to have an enclosed space extending in a longitudinal direction of the upper guide, the upper guide having a constant cross section, a weather strip channel extending in a longitudinal direction of the upper guide and fixed to the upper guide, a window glass guide, made of metal plate, arranged so as to be inclined relative to the upper guide and fixed to the upper guide at one end thereof in order to guide a window glass so as to move, and a pillar outer panel, made of metal plate, for covering, on an exterior side of a vehicle, a vehicle exterior-end surface of the upper guide, a vehicle exterior-end surface of the window glass guide and an opening formed between the upper guide and the window glass guide.

12 Claims, 5 Drawing Sheets

Front ⟵⟶ Rear

U.S. PATENT DOCUMENTS

| | | | |
|---|---|---|---|
| 6,886,881 B1 * | 5/2005 | Henderson et al. | 296/146.2 |
| 7,210,730 B2 * | 5/2007 | Fujita et al. | 296/146.5 |
| 2002/0007599 A1 * | 1/2002 | Pacella et al. | 49/502 |
| 2004/0006923 A1 * | 1/2004 | Nakanishi et al. | 49/502 |
| 2004/0216387 A1 * | 11/2004 | Furuse | 49/502 |
| 2004/0244298 A1 * | 12/2004 | Ogawa et al. | 49/502 |

FOREIGN PATENT DOCUMENTS

| | | |
|---|---|---|
| GB | 2 101 184 | 1/1983 |
| JP | H10-138760 | 5/1998 |
| JP | 11-59186 | 3/1999 |
| JP | H11-263126 | 9/1999 |
| JP | H11-342745 | 12/1999 |
| JP | 2000-52772 | 2/2000 |
| JP | 2002-211243 | 7/2002 |
| JP | 2004-189164 | 7/2004 |
| JP | 2004-224257 | 8/2004 |
| WO | WO 89/04777 | 6/1989 |

* cited by examiner

FIG. 2

Front ←→ Rear

DOORFRAME STRUCTURE

This application is based on and claims priority under 35 U.S.C. §119 to Japanese Patent Application 2004-090338, filed on Mar. 25, 2004, the entire content of which is incorporated herein by reference.

FIELD OF THE INVENTION

This invention generally relates to a doorframe structure. More specifically, this invention relates to a doorframe structure that covers an opening, which is formed between an upper guide of a door sash and a window glass guide that guides a window glass so as to move up and down.

BACKGROUND

Known doorframe structures are disclosed, for example, in JP2002-211243A (paragraph 0028, FIG. 4, FIG. 8), JPH11-342745A and JP H11-263126A (FIG. 4). The doorframe structure disclosed in JP2002-211243A is known as a triangular-garnish type-doorframe, wherein, a garnish made of resin is utilized to cover a substantially triangular opening formed between an upper guide of a door sash (a pillar sash of a door sash) and a window glass.

The doorframe structures disclosed in JPH11-342745A and JPH11-263126A are known as division bar type-doorframes, wherein an opening, formed between the upper guide of a door sash (pillar sash of a door sash) and a division bar (partition sash), is covered by means of a partition panel.

However, according to the doorframe structure disclosed in JP2002-211243A, because the upper guide and the garnish exist independently, a dividing line between the upper guide and the garnish has tended to protrude outwards, thus spoiling the external appearance of the door frame. Further, because the upper guide, the window glass guide and the pillar outer panel are all made of different materials, a sense of uniformity has been lacked and the external appearance of the vehicle has suffered. Furthermore, according to such a doorframe structure, the garnish needs to be painted when it is not mounted on the doorframe, and for this reason, the doorframe has not been manufactured integrally. In addition, a gap has existed on the outside of the vehicle between the upper guide and the garnish, and this has resulted in whistling of the wind while the vehicle is moving.

On the other hand, according to the doorframe structures disclosed in JPH11-342745A and JP H11-263126A, depending on its position, the division bar can block a visual range. In addition, the number of parts used has increased, such as a weather strip fixed to an entire rim of the partition panel, and a bracket used for fixing the division bar. In consequence, the number of man-hours required has increased, and levels of productivity have dropped drastically. Further, in the same manner as the doorframe structure disclosed in JP2002-211243A, according to the doorframe structures disclosed in JPH11-342745A and JP H11-263126A, the garnish needs to be painted when it is not mounted on the doorframe, and for this reason, the doorframe has not been manufactured integrally. In addition, a gap has existed on the outside of the vehicle between the upper guide and the garnish, and this has resulted in whistling of the wind while the vehicle is moving.

Thus, a need exists to provide a doorframe structure in which an upper guide is easily formed, and which can lead to amelioration in the external appearance of the vehicle. The present invention has been made in view of the above circumstances and provides such a doorframe structure.

SUMMARY OF THE INVENTION

According to an aspect of the present invention, a doorframe structure comprises an upper guide formed of metal plate so as to have an enclosed space extending in a longitudinal direction of the upper guide, the upper guide having a constant cross section, a weather strip channel extending in a longitudinal direction of the upper guide and fixed to the upper guide, a window glass guide, made of metal plate, arranged so as to be inclined relative to the upper guide and fixed to the upper guide at one end thereof in order to guide a window glass so as to move, and a pillar outer panel, made of metal plate, for covering, on an exterior side of a vehicle, a vehicle exterior-end surface of the upper guide, a vehicle exterior-end surface of the window glass guide and an opening formed between the upper guide and the window glass guide.

According to another aspect of the present invention, a door frame structure comprises a pillar sash portion includes an upper guide formed of metal plate so as to have an enclosed space extending in a longitudinal direction of the upper guide, the upper guide having a constant cross section, a window glass guide, made of metal plate, arranged so as to be inclined relative to the upper guide and fixed to the upper guide at one end thereof in order to guide a window glass so as to move, a pillar outer panel, made of metal plate, for covering, on an exterior side of a vehicle, a vehicle exterior-end surface of the upper guide, a vehicle exterior-end surface of the window glass guide and an opening formed between the upper guide and the window glass guide, and a roof sash having a constant cross section and extending continuously in a longitudinal direction of the vehicle as far as the upper guide of the pillar sash portion.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 2:
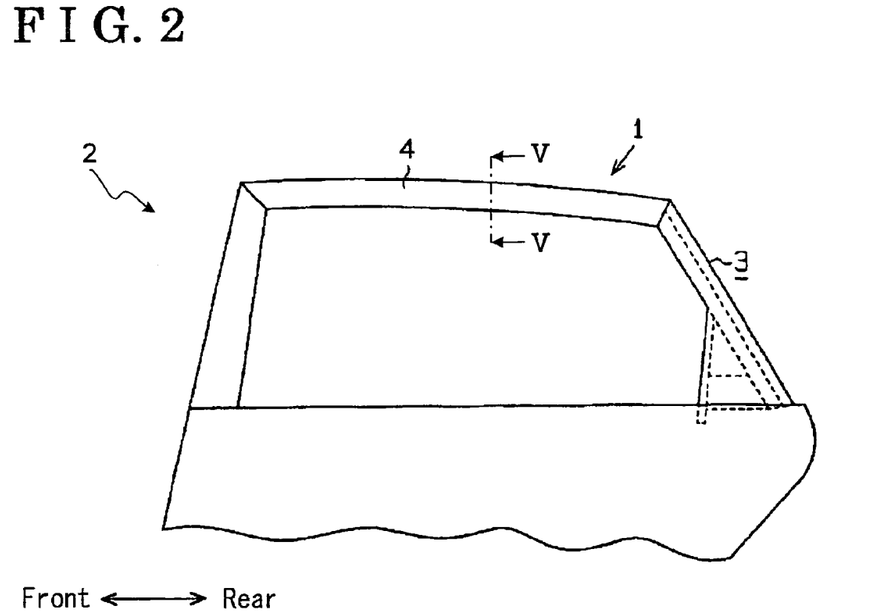
FIG. 2 illustrates a pattern diagram of a rear door to which the present invention is applied.

An embodiment according to the present invention will be explained with reference to the attached diagrams. FIG. 2 illustrates a pattern diagram of a rear door 1 of a vehicle to which the present invention is applied. As shown in FIG. 2, the rear door 1 includes a door sash 2 formed in an approximate C-shape in its cross section so as to extend along an upper structure of the rear door 1. The door sash 2 includes a roof sash portion 4 that extends in a longitudinal direction of the vehicle and a pillar sash portion 3 that extends in an approximately vertical direction. The pillar sash portion 3 is inclined in a condition that an upper end thereof is inclined leftwards in FIG. 2 relative to a lower end thereof. The upper end of the pillar sash portion 3 is welded to a right end of the roof sash portion 4 (rear end in FIG. 2), and the lower end of the pillar sash portion 3 is attached to a door inner panel 21.

Figure 1A:
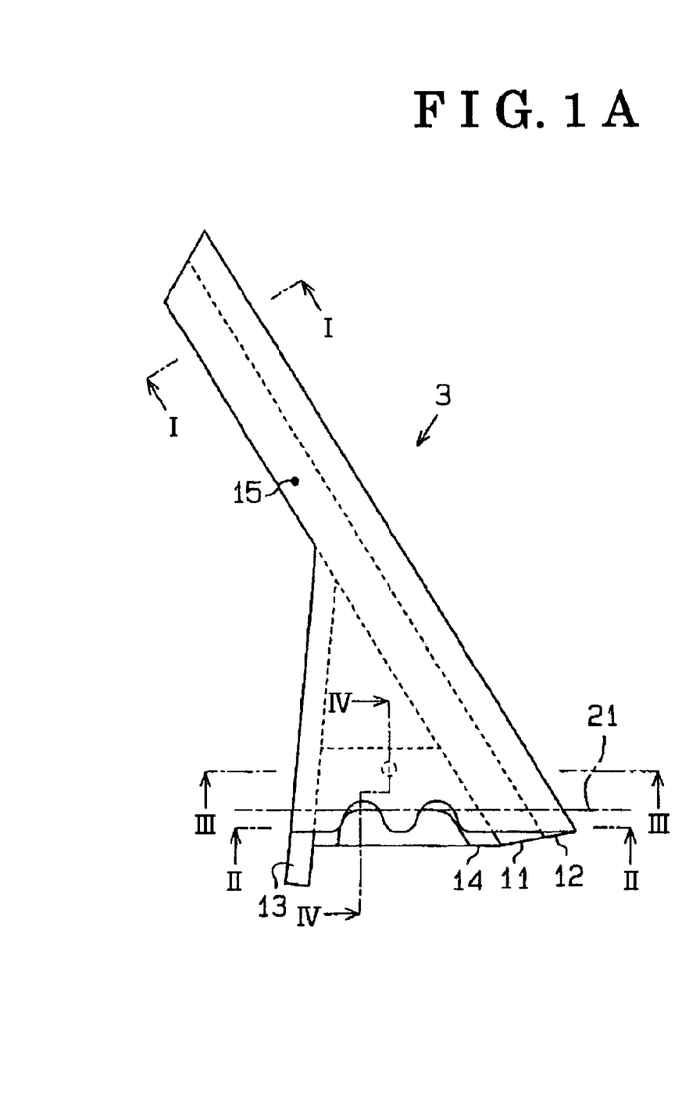
FIG. 1A illustrates a front pattern diagram of a pillar sash portion.
Figure 1B:
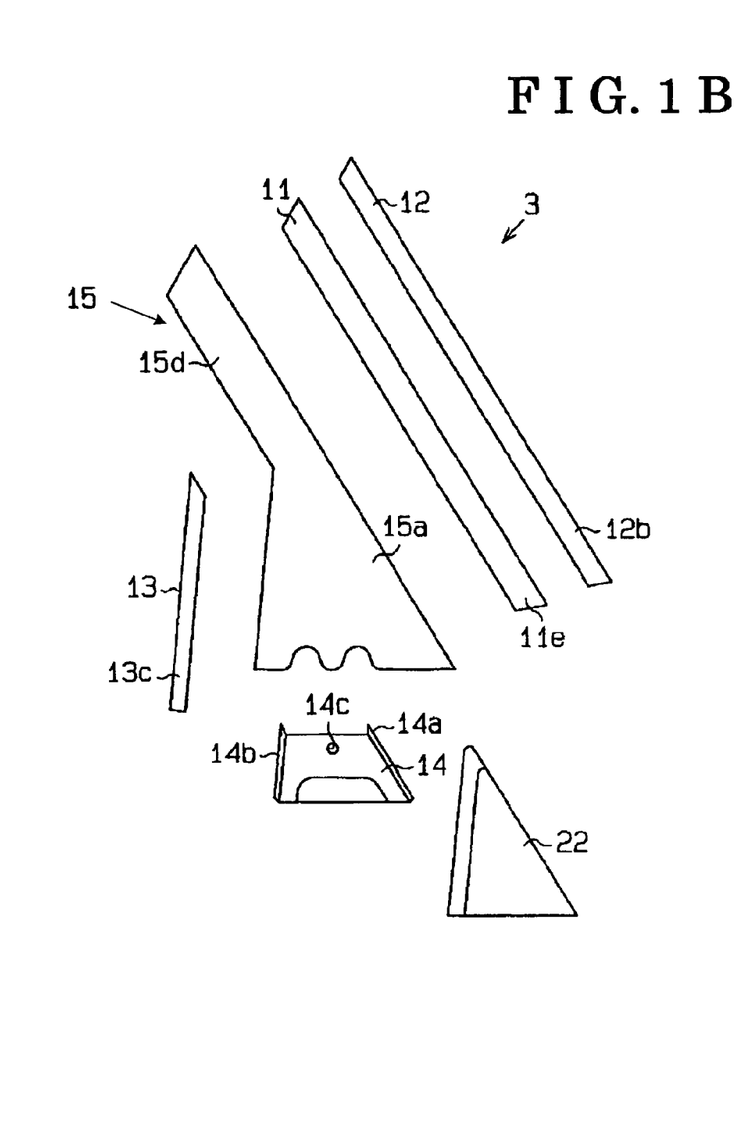
FIG. 1B illustrates an exploded perspective view of the pillar sash portion.
Figure 3:
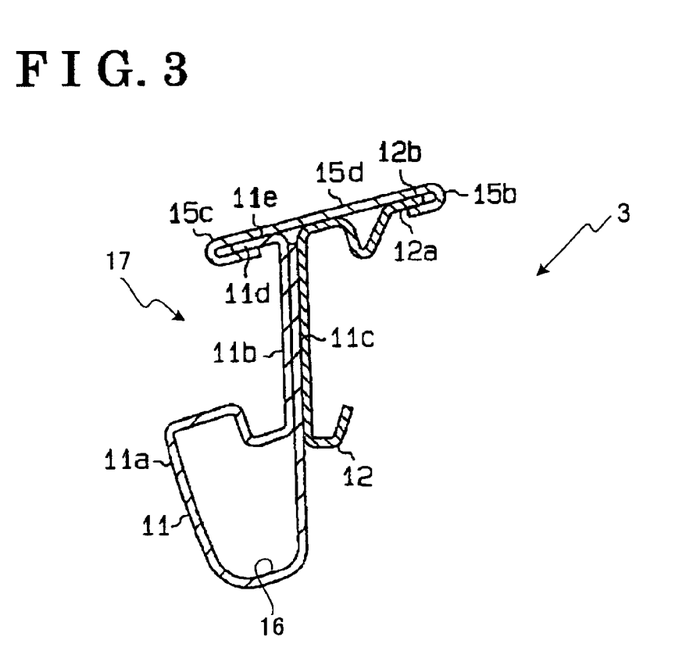
FIG. 3 illustrates a cross section of FIG. 1A along a I-I line.
Figure 4:
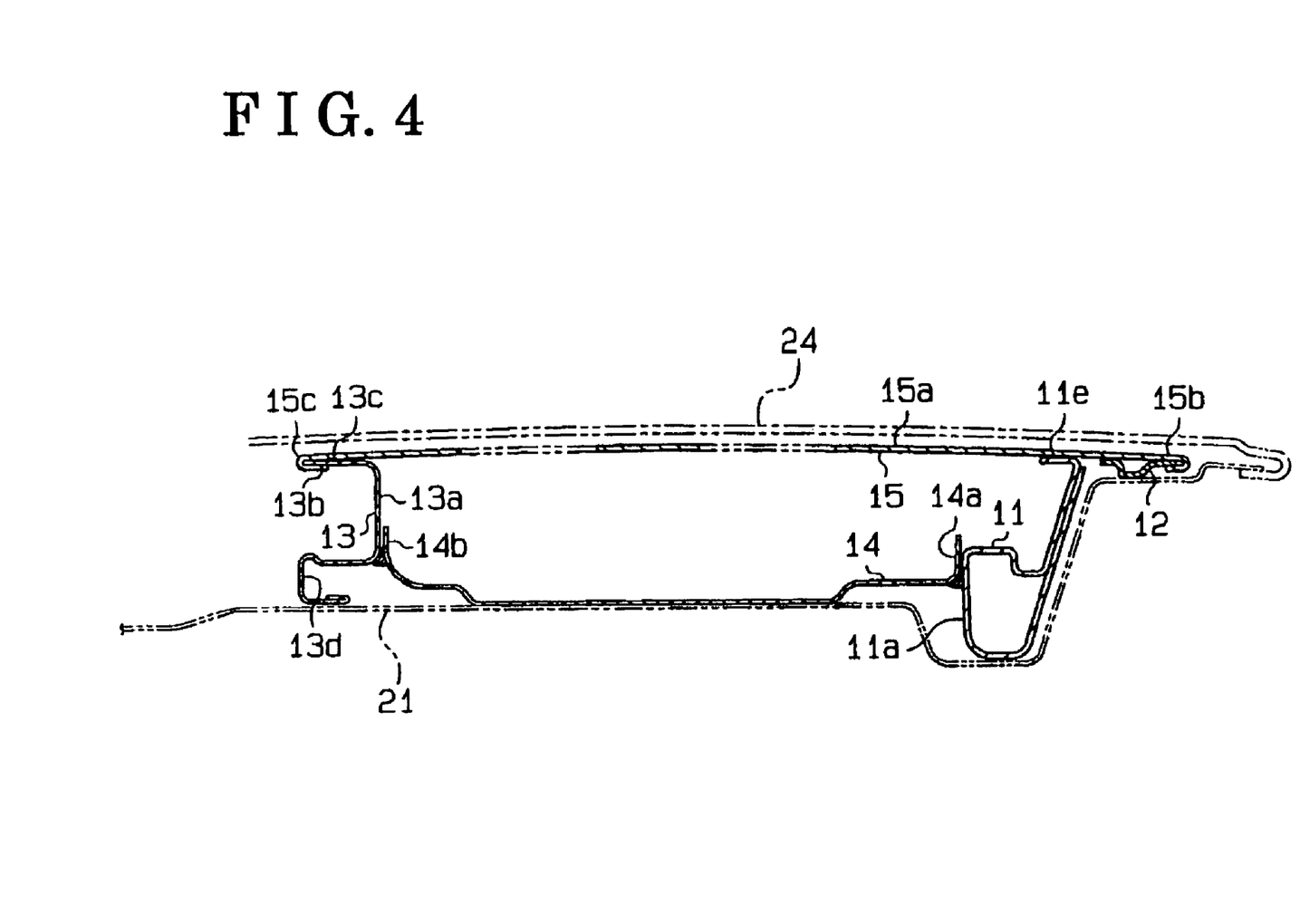
FIG. 4 illustrates a cross section of FIG. 1A along a II-II line.
Figure 5:
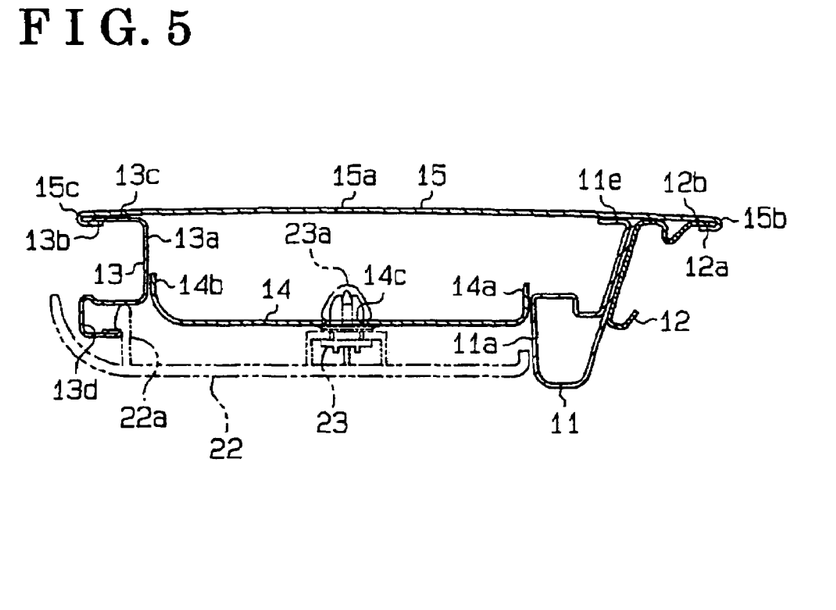
FIG. 5 illustrates a cross section of FIG. 1A along a III-III line.
Figure 6:
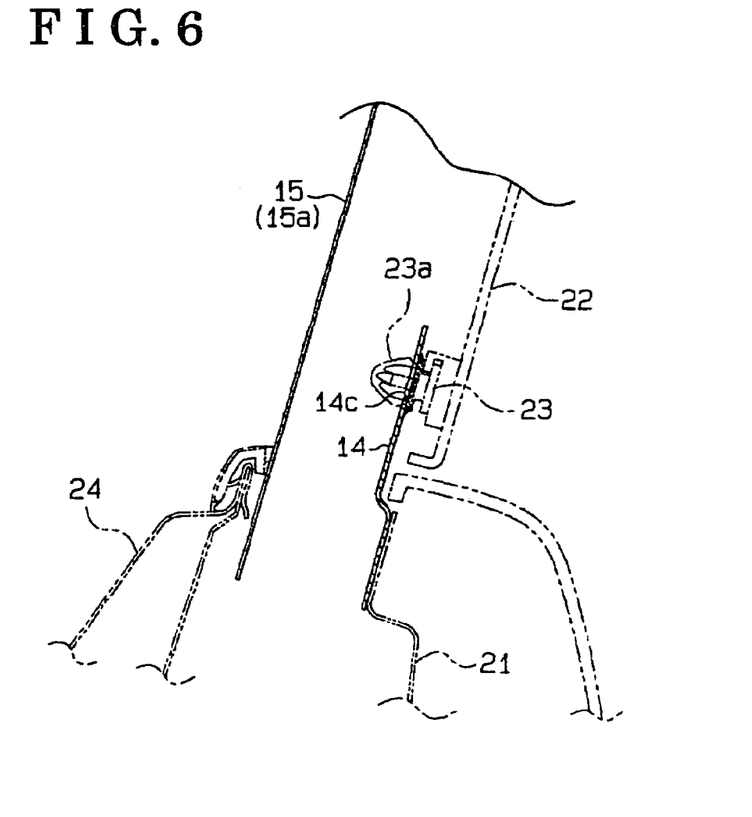
FIG. 6 illustrates a cross section of FIG. 1A along a IV-IV line.

FIG. 1A illustrates a front pattern diagram of the pillar sash portion 3, and FIG. 1B illustrates an exploded perspective view of the pillar sash portion 3. FIG. 3 illustrates a cross section of FIG. 1A along a I-I line, FIG. 4 illustrates a cross section of FIG. 1A along a II-II line, FIG. 5 illustrates a cross section of FIG. 1A along a III-III line, and FIG. 6 illustrates a cross section of FIG. 1A along a IV-IV line.

As shown in FIG. 1, the pillar sash portion 3 includes an upper guide 11, a weather strip channel 12, a window glass guide 13, a bracket 14 and a pillar outer panel 15.

The upper guide 11 serves as a main part of the pillar sash portion 3 of the door sash 2. An upper end of the upper guide 11 (upper end in FIG. 1) is inclined leftwards in FIG. 1 relative to a lower end of the upper guide 11. As shown in FIG. 3, the upper guide 11 is formed of metal plate by means of a roll forming, so as to be in a constant shape in its cross section. Specifically, the upper guide 11 includes an enclosed space 16, a base wall portion 11a, wall portions 11b and 11c, an end portion 11d and an exterior-end surface 11e.

A central portion of the upper guide 11 in its cross section is bended so as to form the enclosed space 16 that is extending in a longitudinal direction of the pillar sash portion 3. Thus, because the upper guide 11 serving as a main part of the pillar sash portion 3 includes the enclosed space 16 within its entire length, stiffness of the pillar sash portion 3 can be secured, as a result the pillar sash portion 3 has an advantage in point of strength. In FIG. 3, the base wall portion 11a is positioned on one side of the upper guide 11 (the left side in FIG. 3), the wall portion 11b extends in an upwards direction in FIG. 3 from one end of the base wall portion 11a, and the wall portion 11c extends in an upwards direction in FIG. 3 from the other end of the base wall portion 11a. The base wall portion 11b abuts onto the base wall portion 11c in its cross section, as shown in FIG. 3. The end portion 11d extends from an end portion of the wall portion 11b so as to protrude leftward in FIG. 3. On an upper portion of the end portion 11d in FIG. 3, the exterior-end surface 11e is formed so as to face the outside of the vehicle. Further, a run channel portion 17 is formed with the base wall portion 11a, the wall portion 11b and the end portion 11d as shown in FIG. 3. The run channel portion 17 is formed in an approximate reverse C-shape and extending in a longitudinal direction of the pillar sash portion 3.

As shown in FIG. 3, the weather strip channel 12 is made of metal plate and formed in a constant shape in its cross section. The weather strip channel 12 is welded to the upper guide 11 in such a way that the weather strip channel 12 abuts onto the wall portion 11c of the upper guide 11. The weather strip channel 12 includes an end portion 12a that is bent at one end of the weather strip channel 12 and extends in a right direction in FIG. 3. To the weather strip channel 12, a weather strip (not shown) is attached so as to prevent water from penetrating into the inside the vehicle.

As shown in FIG. 1, an upper end of the window glass guide 13 in FIG. 1 is inclined rightwards in FIG. 1 relative to a lower end of the window glass guide 13, and one end of the window glass guide 13 is fitted into the run channel portion 17 of the upper guide 11 so as to be welded to a central portion of the upper guide 11 in a longitudinal direction. As shown in FIG. 4, the window glass guide 13 is made of metal plate and formed in a constant shape in its cross section so as to form a base wall portion 13a. The base wall portion 13a is positioned on one side of the window glass guide 13 (the right side in FIG. 4), and an end portion 13b is bent at one end of the base wall portion 13a and extends in a leftward direction in FIG. 4. On upper portion of the end portion 13b in FIG. 4, an exterior-end surface 13c is formed so as to face the outside of the vehicle. Further, the base wall portion 13a is bent at its other end and extends in a leftward direction in FIG. 4. Furthermore, the base wall portion 13a extends in a downward direction and further extends in a right direction so as to form a hook portion 13d.

The run channel portion 17 of the upper guide 11 is continuously connected to a reverse C-shaped opening formed on the left of the base wall portion 13a between the end portion 13b and the hook portion 13d, and then a run channel (not shown) is attached to the run channel portion 17. Thus, by means of the run channel together with the window glass guide 13, the window glass of the vehicle is guided so as to move up and down.

As shown in FIG. 1, the bracket 14 is formed in a trapezoid shape. The bracket 14 is provided between the upper guide 11 and the window glass guide 13 so as to connect them at a bottom portion thereof in FIG. 1. Specifically, as shown in FIG. 4, a curved portion 14a is formed at one end of the bracket 14, and a curved portion 14b is formed at the other end of the bracket 14. The curved portion 14a is formed so as to be curved along the base wall portion 11a, and the curved portion 14b is formed so as to be curved along the base wall portion 13a. Thus, the bracket 14 is connected to the upper guide 11 in such a way that the base wall portion 11a is connected and welded to the curved portion 14a, and the bracket 14 is connected to the window glass guide 13 in such a way that the base wall portion 13a is attached to the curved portion 14b. The bracket 14 is welded onto a door inner panel 21 (a door panel) so as to abut onto the door inner panel 21 at a flat portion that is formed between the curved portion 14a and the curved portion 14b, and that corresponds to the interior of the vehicle at a lower side in FIG. 4.

Further, the bottom end of the upper guide 11 in FIG. 1 protrudes toward the door inner panel 21 so as to form a protruding portion. The bottom end of the window glass guide 13 in FIG. 1 also protrudes toward the door inner panel 21 so as to form a protruding portion. Such the protruding portions are welded to the door inner panel 21 so as to be superposed thereon. Even when the length of the protruding portions are short, because the pillar sash portion 3 is also welded by means of the bracket 14, the binding force between the pillar sash portion 3 and the door inner panel 21 can be enhanced.

Further, as show in FIG. 5 and FIG. 6, the bracket 14 supports an inner garnish 22 that is made of resin. The inner garnish 22 covers on the inside of the vehicle an approximate triangle-opening formed between the upper guide 11 and the window glass guide 13. Specifically, a clip hole 14c is formed on the bracket 14 at a central portion thereof, and a clip 23 is formed on the inner garish 22 so as to face the clip hole 14c. Further, an engaging portion 23a being elastically deformable is formed on the clip 23. In this configuration, the engaging portion 23a penetrates the clip hole 14c so as to engage with a peripheral portion of the clip hole 14c. Thus, the inner garnish 22 is supported by bracket 14 and prevented from being pulled out.

On one side of the inner garnish 22 (leftward in FIG. 5), a stopper 22a is formed so as to be engaged with the hook portion 13d. Thus, by means of the stopper 22a that is engaged with the hook portion 13d, rotation of the inner garnish 22, which is supported by the bracket 14 at a point on the hook portion 13d, is restricted.

As shown in FIG. 1, the pillar outer panel 15 includes a flat portion 15a, which is formed in a approximately triangular shape, and a long portion 15d, which extends in an upward direction from the flat portion 15a in FIG. 1. By means of the pillar outer panel 15, at the flat portion 15a thereof, together with a vehicle exterior-end surface 11e of the upper guide 11, a vehicle exterior-end surface 12b of the weather strip channel 12 and a vehicle exterior-end surface 13c of the window glass guide 13, a approximate triangle-opening formed between the upper guide 11 and the window glass guide 13 is covered on the outside of the vehicle.

Further, the pillar outer panel 15 includes a folded portion 15b (first folded portion) and a folded portion 15c (second folded portion). The folded portion 15b has been formed by folding one end portion (first end portion) of the pillar outer panel 15 so as to enclose the end portion 12a of the weather strip channel 12, and the folded portion 15c has been formed by folding the other end portion (second end portion) of the pillar outer panel 15 so as to enclose the end portion 11d of the upper guide 11 at the long portion 15d as shown in FIG. 3, and enclose the end portion 13b of the window glass guide 13 at the flat portion 15a as shown in FIG. 4. The pillar outer panel 15 is connected to the weather strip channel 12 with the end portion 12a of the weather strip channel 12 tightened and constricted by the folded portion 15b so as to be caulked. Further, the pillar outer panel 15 is connected to the upper guide 11 with the end portion 11d tightened and constricted by the folded portion 15c so as to be caulked, at the same time, the pillar outer panel 15 is connected to the window glass guide 13 with the end portion 13b tightened and constricted by the folded portion 15c so as to be caulked.

A door outer panel 24 is positioned below the pillar outer panel 15. The door outer panel 24 forms a designing surface of the rear door 1. The pillar outer panel 15 is connected to the door outer panel 24 in a condition that a gap between the two is, to all intents and purposes, insignificant. Thus, only the flat portion 15a is exposed outside of the vehicle.

Figure 7:
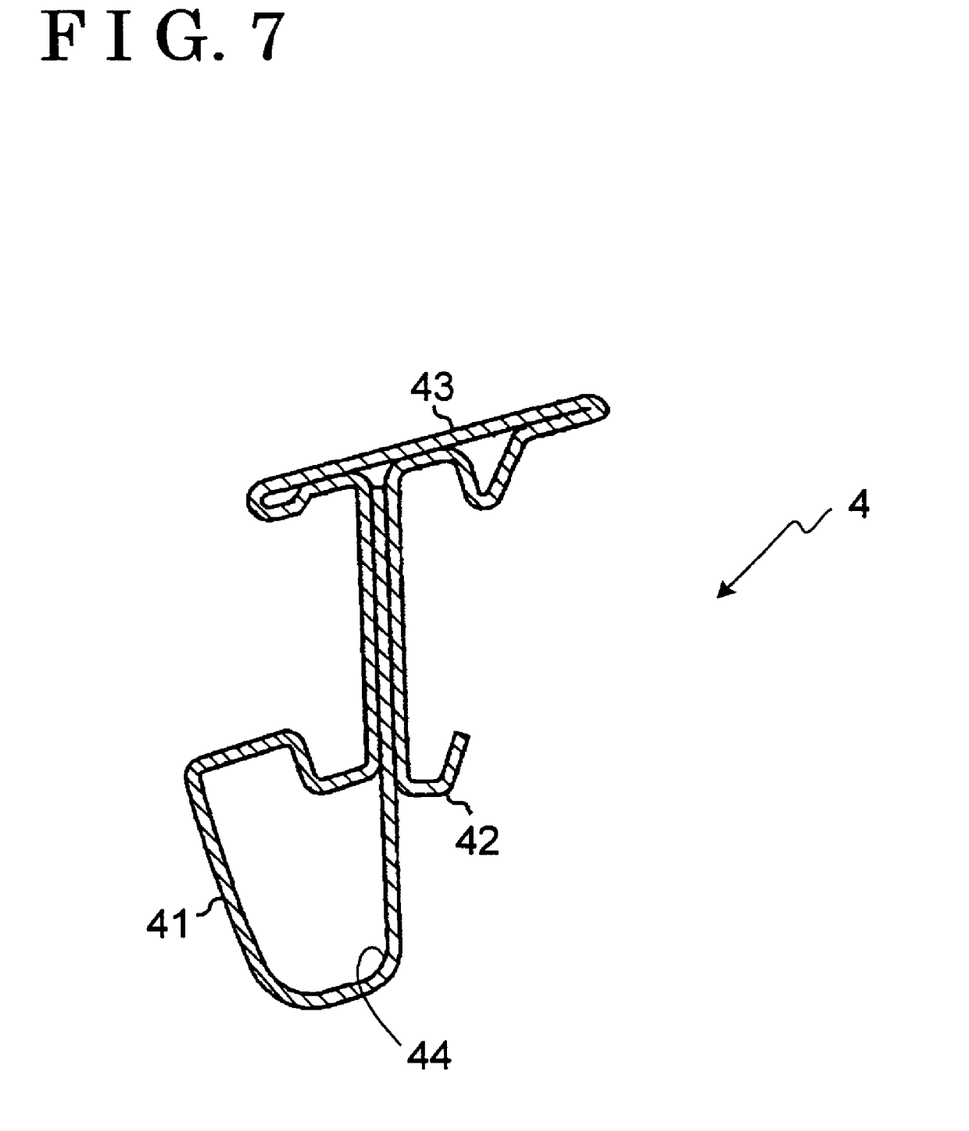
FIG. 7 illustrates a cross section of FIG. 2 along a V-V line.

As shown in FIG. 7, the roof sash portion 4 includes an upper guide 41 having an enclosed space 44 that is similar to the enclosed space 16 of the upper guide 11 and a weather strip channel 42 that is similar to the weather strip channel 12. The roof sash portion 4 is formed of metal board so as to have a constant cross section. The constant cross section of the roof sash portion 4 is approximately the same as the constant cross section of the upper end of the pillar sash portion 3, and thus the roof sash portion 4 is extending in a longitudinal direction of the vehicle continuously from the upper end of the pillar sash portion 3, and thus the roof sash portion 4 and the pillar sash portion 3 have, to all intents and purposes, a constant cross section.

In this circumstance, because the door sash 2 includes the upper guide 11 and the upper guide 41, and the upper guide 11 has the enclose spaces 16 within its entire length and the upper guide 41 has the enclosed space 44 within its entire length, and further the roof sash portion 4 is connected to the pillar sash portion 3 by means of welding so that the roof sash portion 4 so as to have the approximate constant cross section, strength of the door sash 2 can be enhanced. Further, a value of the thickness of the roof sash portion 4 (the upper guide 41, the weather strip channel 42 and the pillar outer panel 43) is identical with a value of the thickness of the pillar sash portion 3 (the upper guide 11, the weather strip channel 12 and the pillar outer panel 15). The pillar outer panel 43 of the roof sash portion 4 may be provided independently from the upper guide 41 and the weather strip channel 42 in the same manner as the pillar outer panel 15 of the pillar sash portion 3. The upper guide 41 may extend integrally from the weather strip channel 42.

(1) According to the embodiment, by use of the pillar outer panel 15, together with the exterior-end surface 11e of the upper guide 11, the exterior-end surface 12b of the weather strip channel 12, the exterior-end surface 13c of the window glass guide 13; the opening formed between the upper guide 11 and the window glass guide 13 is covered along an entire surface of the pillar outer panel 15 on the outside of the vehicle. Thus, a dividing line between the upper guide 11 and the window glass guide 13 does not expose outwards. Further, the pillar outer panel 15, the upper guide 11, the window glass guide 13 and the rear door 1 can be made of an identical material (metal plate), as a result, uniformity is achieved and the external appearance of the vehicle can be ameliorated.

In this circumstance, when the pillar sash portion 3 (except the inner garnish 22) is mounted on the door 1, the door 1 can be painted entirely, and for this reason, integral production of the doorframe can be achieved. In addition, because, on the outside of the vehicle, the pillar outer panel 15 adopts a flat form and no gap is created between the upper guide and the window glass guide, the whistling of the wind while the vehicle is moving can be prevented.

Specifically, the upper guide 11 having a constant shape in its cross section can be easily formed by uniform processing of the metal plate.

(2) According to the embodiment, the hook portion 13d is formed on the window glass guide 13, and the inner garnish 22 is engaged with the hook portion 13d. Thus, even when the inner garnish 22 is supported at one point, the inner garnish 22 is engaged with the hook portion 13d and rotation of the inner garnish 22 thereby restricted. In other words, because the inner garnish 22 does not need to be supported by the bracket 14 at plural points for rotation of the inner garnish 22 to be restricted, there is no need to apply additional processing to the bracket 14 for supporting the inner garnish 22 at plural points. Thus, in this structure, enough stiffness on the bracket 14 can be secured, comparing to a structure in which a bracket 14 has plural mounting holes. In addition, because there is no need to enlarge the bracket 14 to secure its stiffness, space can be saved, as a result the costs can be reduced. In addition, there is no need to provide additional parts to the bracket 14 for mounting the inner garnish 22. Thus, the number of parts used can be reduced, in consequence, the number of man hours required can be reduced, and as a result, the costs can be reduced.

(3) According to the embodiment, the weather strip channel 12 has the end portion 12a that protrudes in one direction along the pillar outer panel 15, and wherein the pillar outer panel 15 is connected to the weather strip channel 12 with the end portion 12a of the weather strip channel 12 tightened and constricted by the folded portion 15b so as to be caulked. Thus, a connecting portion between the pillar outer panel 15 and the weather strip channel 12 is not exposed outside, as a result the external appearance of the vehicle can be further ameliorated.

(4) According to the embodiment, the window glass guide 13 has the end portion 13b that protrudes in the other direction along the pillar outer panel 15, and wherein the pillar outer panel 15 is connected to the window glass guide 13 with the end portion 13b of the window glass guide 13 tightened and constricted by the folded portion 15c so as to be caulked. Thus, a connecting portion between the pillar outer panel 15 and the window glass guide 13 is not exposed outside, as a result the external appearance of the vehicle can be further ameliorated.

In the same manner, the upper guide 11 has the end portion 11d that protrudes in the other direction along the pillar outer panel 15, and wherein the pillar outer panel 15 is connected to the upper guide 11 with the end portion 11d of the upper guide 11 tightened and constricted by the folded portion 15c so as to be caulked. Thus, a connecting portion between the pillar outer panel 15 and the upper guide 11 is not exposed outside.

(5) According to the embodiment, the weather strip channel 12 can be easily formed by uniform processing of the metal plate. Further, the window glass guide 13 can also be easily formed by uniform processing of the metal plate.

(6) According to the embodiment, even when the length of a protruding portions formed on the upper guide 11 and the window glass guide 13, which protrude toward the door inner panel 21, are short, because the pillar sash portion 3 is connected to the door inner panel 21 by means of the bracket 14, enough connecting force between the pillar sash portion 3 and the door inner panel 21 can be secured. Thus, because there is no need provide long protruding portions on the upper guide 11 and the window glass guide 13, materials for these parts can be reduced, as a result, the costs can be reduced. Further, because the length of the protruding portions on the upper guide 11 and the window glass guide 13 can be short, a configuration within the rear door 1 (a configuration within the door inner panel 21 and the door outer panel 24) has more flexibility.

The embodiment can be altered as follows.

A connecting condition between the upper guide 11 and the weather strip channel 12, and a connecting condition between the window glass guide 13 and the pillar outer panel 15, are nothing but examples. They may be changed to another way.

The shapes of the upper guide 11, the weather strip channel 12 and the window glass guide 13 may be changed alternatively. In addition, each of the weather strip channel 12 and the window glass guide 13 may not have a constant shape in its cross section.

The upper guide 11, the window glass guide 13 and the bracket 14 may be fixed (welded) to the door outer panel 24.

This invention may be used for a front door. Further, the upper guide may comprise a pillar sash portion on a front portion of the door sash.

According to the present invention, by means of a pillar outer panel made of metal plate, together with a vehicle exterior-end surface of the upper guide and a vehicle exterior-end surface of the window glass guide, an opening formed between the upper guide and the window glass guide is covered along an entire surface of the pillar outer panel. Thus, a dividing line between the upper guide and the window glass guide is not exposed outside. Further, the pillar outer panel, the upper guide, the window glass guide and the door can be made of an identical material (metal plate). In this condition, uniformity is achieved and the external appearance of the vehicle can be ameliorated.

Further, in this circumstance, the door on which the doorframe is mounted can be painted entirely, and for this reason, integral production of the doorframe can be achieved. In addition, because, on the outside of the vehicle, the pillar outer panel adopts a flat form and no gap is created between the upper guide and the window glass guide, the whistling of the wind while the vehicle is moving can be prevented. Specifically, an upper guide having a constant shape in its cross section can be easily formed by uniform processing of the metal plate.

Furthermore, the upper guide has the enclosed space, which extends in a longitudinal direction of the upper guide, so as to secure stiffness of the door sash.

In addition, according to this invention, a hook portion is formed on the window glass guide, and the inner garnish is engaged with the hook portion. Thus, even when the inner garnish is supported at one point by, for example the bracket, the inner garnish is engaged with the hook portion and rotation of the inner garnish thereby restricted. In other words, because the inner garnish does not need to be supported by the bracket at plural points for rotation of the inner garnish to be restricted, there is no need to apply additional processing to the bracket for supporting the inner garnish at plural points.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A doorframe structure comprising:
an upper guide formed of metal plate so as to have an enclosed space extending in a longitudinal direction of the upper guide, the upper guide having a constant cross section;
a weather strip channel extending in a longitudinal direction of the upper guide and fixed to the upper guide;
a window glass guide having a length, made of metal plate, arranged so as to be inclined along its entire length relative to the upper guide and fixed directly to the upper guide at a fixing portion at one end thereof in order to guide the movement of a window glass; and
a pillar outer panel, made of metal plate, covering, on an exterior side of a vehicle, a vehicle exterior surface of the upper guide along an entire length of the upper guide so as to exceed the fixing portion between the one end of the window glass guide and the upper guide, a vehicle exterior surface of the window glass guide and an opening formed between the upper guide and the window glass guide,
wherein the pillar outer panel covers the weather strip channel.

2. The doorframe structure according to claim 1, wherein the upper guide includes a run channel portion for guiding the movement of the window glass, and the window glass guide is fixed in a continuous manner to the run channel portion of the upper guide.

3. The doorframe structure according to claim 1 further comprising a bracket, one end of which is fixed to the upper guide, and the other end of which is fixed to the window glass guide, the bracket also being secured to a door panel.

4. The doorframe structure according to claim 3, wherein the window glass guide includes a hook portion with which an inner garnish can be engaged, the inner garnish supported by the bracket and covering, on an interior side of the vehicle, the opening formed between the upper guide and the window glass guide.

5. A doorframe structure comprising:
a pillar sash portion including an upper guide formed of metal plate so as to have an enclosed space extending in a longitudinal direction of the upper guide, the upper guide having a constant cross section;
the pillar sash portion also including a weather strip channel extending in a longitudinal direction of the upper guide and fixed to the upper guide;
a window glass guide having a length, made of metal plate, arranged so as to be inclined along its entire length relative to the upper guide and fixed directly to the upper guide at a fixing portion at one end thereof in order to guide the movement of a window glass;

a pillar outer panel, made of metal plate, covering, on an exterior side of a vehicle, a vehicle exterior surface of the upper guide along an entire length of the upper guide so as to exceed the fixing portion between the one end of the window glass guide and the upper guide, a vehicle exterior surface of the window glass guide and an opening formed between the upper guide and the window glass guide, and a roof sash portion having a constant cross section that is approximately the same as the constant cross section of the pillar sash portion and extending in a longitudinal direction of the vehicle continuously from the upper guide of the pillar sash portion, wherein the pillar outer panel covers the weather strip channel.

6. The doorframe structure according to claim 1, wherein the weather strip channel having an end portion that protrudes in a first direction along the pillar outer panel is fixed to the upper guide, and wherein the pillar outer panel is connected to the weather strip channel with the end portion of the weather strip channel tightened and constricted by a first folded portion so as to be caulked, the first folded portion having been formed by folding a first end portion of the pillar outer panel in an inward direction of the vehicle so as to enclose the end portion.

7. The doorframe structure according to claim 6, wherein the weather strip channel is formed of metal plate so as to have a constant cross section.

8. The doorframe structure according to claim 1, wherein the window glass guide having an end portion that protrudes in a second direction along the pillar outer panel is connected to the pillar outer panel with the end portion of the window glass guide tightened and constricted by a second folded portion so as to be caulked, the second folded portion having been formed by folding a second end portion of the pillar outer panel in an inward direction of the vehicle so as to enclose the end portion.

9. The doorframe structure according to claim 6, wherein the window glass guide having an end portion that protrudes in a second direction along the pillar outer panel is connected to the pillar outer panel with the end portion of the window glass guide tightened and constricted by a second folded portion so as to be caulked, the second folded portion having been formed by folding a second end portion of the pillar outer panel in an inward direction of the vehicle so as to enclose the end portion.

10. The doorframe structure according to claim 7, wherein the window glass guide having an end portion that protrudes in a second direction along the pillar outer panel is connected to the pillar outer panel with the end portion of the window glass guide tightened and constricted by a second folded portion so as to be caulked, the second folded portion having been formed by folding a second end portion of the pillar outer panel in an inward direction of the vehicle so as to enclose the end portion, folding one end of the pillar outer panel, and the second folded portion is formed by folding the other end of the pillar outer panel.

11. The doorframe structure according to claim 9, the first direction is in a reverse direction to the second direction, and the first folded portion is formed by folding one end of the pillar outer panel, and the second folded portion is formed by folding the other end of the pillar outer panel.

12. The doorframe structure according to claim 10, the first direction is in a reverse direction to the second direction, and the first folded portion is formed by folding one end of the pillar outer panel, and the second folded portion is formed by folding the other end of the pillar outer panel.

* * * * *